D. S. BEACH.
RESILIENT WHEEL.
APPLICATION FILED JULY 24, 1916.

1,298,438.

Patented Mar. 25, 1919.

WITNESSES
G H Taylor
H. H. Babcock.

INVENTOR
David S. Beach,

BY Richard S. Owen.

ATTORNEY

UNITED STATES PATENT OFFICE.

DAVID S. BEACH, OF BRIDGEPORT, CONNECTICUT.

RESILIENT WHEEL.

1,298,438.  Specification of Letters Patent.  Patented Mar. 25, 1919.

Application filed July 24, 1916. Serial No. 111,047.

*To all whom it may concern:*

Be it known that I, DAVID S. BEACH, a citizen of the United States, residing at Bridgeport, in the county of Fairfield and State of Connecticut, have invented certain new and useful Improvements in Resilient Wheels, of which the following is a specification.

This invention relates to resilient wheels, and more particularly to a resilient wheel especially adapted for use in connection with automobiles and similar vehicles.

One of the main objects of the invention is to provide a wheel of the character stated which possesses great strength and resiliency.

A further object is to provide a wheel of simple construction which may be used in combination with an ordinary wagon wheel of standard make.

Further objects will appear from the detail description.

Figure 1:
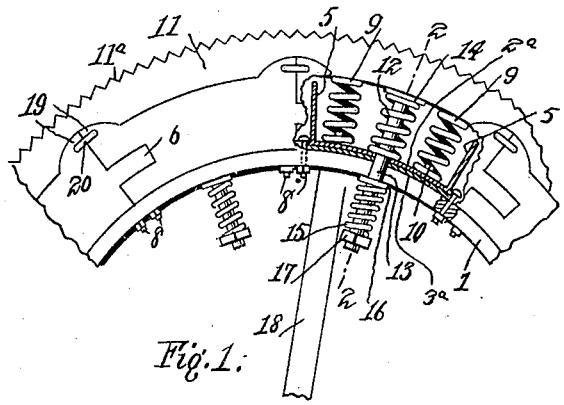
Figure 1 is a fragmentary side view of the invention partly in section.

1 designates a felly of steel or other suitable material. On this felly I secure a series of supporting sections. Each of these sections is formed of the members 2 and 3. These members are of arcuate shape and are stamped with inwardly projecting base flanges 2ª and 3ª. The members 2 and 3 are further provided, near each end, with perforated ears 4. The member 2 is also provided with laterally projecting spacing webs 5 of less height than the vertical wall of said member which have their outer edges rounded and engage the inner face of the vertical wall of member 3 so as to hold the two members in spaced relation. Each member is further provided at one end, with an integral tongue 6 and at the other end with a slot 7.

Figure 2:
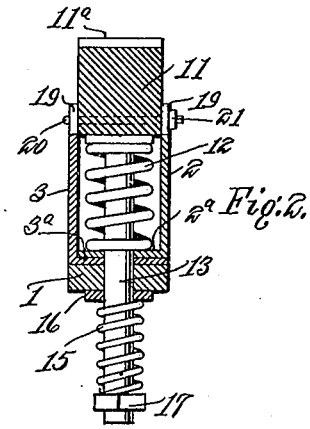
Fig. 2 is a section on the line 2—2 of Fig. 1.
Figure 4:
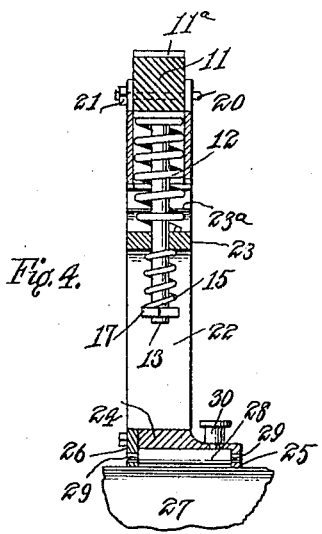
Fig. 4 is a section on the line 4—4 of Fig. 3.

In assembling the wheel, the ears 4 are turned inward at right angles so as to overlap each other. The member 3 is then secured on the outer surface of the felly 1 and the member 2 is seated in the same as in Fig. 2. When these two members are in position suitable bolts 8 are passed through the alined apertures of the ears 4 and through the felly 1. This firmly secures the sections of the tire supporting rim to the felly 1 and also secures the elements 2 and 3 against lateral displacement. The tongues 6 of one member of a tire supporting section fit snugly into the slot 7 of the member of the succeeding section. This forms a tense structure about the periphery of the felly 1, the elements of which are rigidly connected and are secured against peripheral, radial or lateral displacement.

When two members of a section are assembled they form a pocket such as shown in Fig. 1. In each pocket thus formed, near each end thereof, I mount a pair of coil springs 9, the inner ends of which fit about centering studs 10 projecting from the outer face of the flange base 2ª for this purpose. The outer ends of the springs will be pressed firmly against the inner face of a tire 11 of rubber or other suitable resilient material mounted in the tire supporting rim. These springs give the tire greatly increased resiliency, as well as forming supporting means for the same.

Intermediate the springs 9, I mount a third spring 12. This spring is mounted about the outer portion of a bolt 13 provided at its outer end with a circular head 14, which bolt projects through alined apertures in the felly 1 and the base flanges of the members 2 and 3. A coil spring 15 is mounted on the inner portion of the bolt 13 and is confined between a washer 16 mounted about the bolt adjacent the inner face of the felly 1 and a nut 17 threaded on the inner end of the bolt.

The felly 1 is connected to the usual hub by means of radially disposed spokes 18 in the ordinary manner. The springs 9 and 12 provide a support of great resiliency for the load which the wheel carries.

The outer peripheral face of the tire 11 is serrated as at 11ª in order to increase its grip, thus effectually preventing slipping or skidding of the vehicle. As an additional means for securing the tire 11 in place, the members 2 and 3 of the tire rim sections are provided at each end, with outwardly projecting apertured ears 19. The ears of one section, when the wheel is assembled, abut against the ears of the next section so as to form an arcuate extension, which projects radially outward along that side of the tire and is provided with two spaced apertures. A U-clip 20 is inserted through the apertures of this projection and has nuts 21 threaded on the other ends of its arms. It will be understood that the arms of this clip pass through the tire and through the apertures of the members 19 on the opposite side of the tire, these members being in alinement transversely of the tire.

Figure 3:
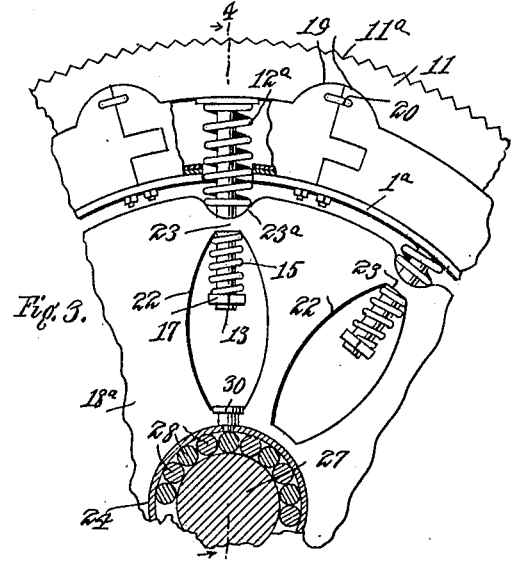
Fig. 3 is a fragmental side view of a modified form of the invention.
Figure 6:
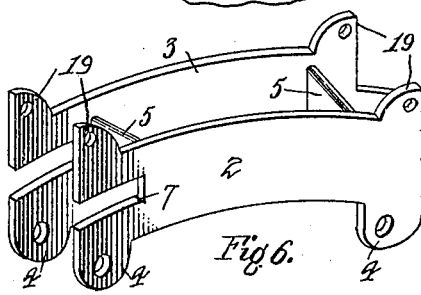
Fig. 6 is an enlarged detail persective view of one of the supporting sections.

In Fig. 3 of the drawings, I replace the spokes 18 by a central disk 18ª provided with radially disposed apertures 22 closed by bridge pieces 23 at their outer ends. The bolts 13 project through these bridge pieces and the coil spring 15 is confined between the bridge piece and the nut 17. The coil spring 12ª is mounted about the outer portion of the bolt and extends inward through and beyond the felly 1ª and has its inner end seated in a recess 23ª in the periphery of the disk 18ª. In all other respects so far as the resilient mounting of the tire and tire supporting rim is concerned, this construction is similar to that shown in Figs. 1 and 2 and above described in detail.

At the center of the disk 18ª I provide an integral hub 24. This hub is provided on one end with an inwardly projecting annular flange 25. On the other end of the hub, I secure a hub plate 26 which has a central bore to receive the spindle 27 of an axle of suitable construction. The flange 25 of hub 24, and plate 26, are both provided with axially disposed apertures, those of the flange being in alinement with the apertures in the plate, when the latter is secured in position. A plurality of anti-friction rollers 28 are mounted in the hub by means of integral gudgeons 29 which fit into the apertures of the hub plate and the hub flange. These rollers contact with the peripheral surface of the axle spindle, in the usual manner, so as to reduce friction and the wear incident thereto to the minimum. The hub 24 is further provided with a grease box 30 which communicates with the interior of the hub through the usual openings. This insures proper lubrication of the rollers and axle spindles.

Figure 5:
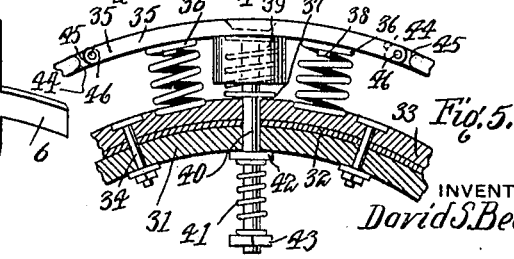
Fig. 5 is a fragmentary side view partly in section of a modified form of the invention.

In Fig. 5, I have shown the construction of a tire especially adapted to be applied to wheels of standard construction. In this figure the numeral 31 designates the felly of a wagon wheel of ordinary construction upon which is secured the usual steel tire 32. About the wheel I firmly secure a felly 33 by means of bolts 34 inserted through the same and through the wheel tire and felly and secured in position by nuts threaded on the inner ends thereof.

Concentric with the felly 33 I mount a flexible tire 35. This tire is spaced from the felly 33. At suitable intervals, I mount sets of coil springs 36, between the tire and felly. Each set of springs consists of two lateral springs 36 and a central spring 37. Each spring 36 has its inner end seated in a recess in the felly 33 and its outer end mounted about a central stud 38 formed integral with and projecting inward from the tire 35. The center spring 37 is mounted in a cylindrical casing 39 projecting inward from the tire about the outer portion of a bolt 40 having its head countersunk in the tire and projecting inwardly beyond the felly 31 through alined apertures in the felly 33, tire 32, and the felly. About the inner portion of bolt 40 is mounted a lighter coil spring 41 confined between a washer 42 adjacent the inner face of the felly 31 and a nut 43 threaded on the inner end of the bolt.

The tire 35 is constructed of a plurality of transversely connected arcuate sections 35ª. Each of these sections is provided in one end with a slot 44 and at the other end with an integral tongue 45. The tongue 45 of one section fits into the slot 44 of the succeeding section and is pivotally secured therein by a pin 46. This provides a tire of great flexibility, which insures the maximum gripping or traction surface. This tire is resiliently supported by the springs 36, 37, 38, and 41, which insures a wheel of great resiliency.

There may be changes made in the construction and arrangement of the different parts of my invention, and I intend to include all such variations in this application as fall within the scope of the appended claims in which a preferred form only of my invention is disclosed.

What I claim is:

1. In a resilient wheel, the combination of a felly, a tire supporting rim composed of a plurality of interlocking sections secured to said felly, each of said sections forming a spring pocket, a tire mounted in the tire supporting rim, means for securing the tire in the said tire supporting rim and for securing the interlocking sections of said rim together, and a plurality of resilient members mounted in each of said spring pockets and engaging the inner face of said tire.

2. In a resilient wheel, the combination of a felly, a tire supporting rim composed of a plurality of arcuate sections secured to said felly, each of said sections forming a spring pocket, a tire mounted in the tire supporting rim, means for securing the tire in said tire supporting rim and for securing the sections of said rim together, and a plurality of resilient members mounted in each of said spring pockets and engaging the inner face of said tire.

In testimony whereof I affix my signature in presence of two witnesses.

DAVID S. BEACH.

Witnesses:
WALLACE A. SMITH,
I. L. BELDEN.

Copies of this patent may be obtained for five cents each, by addressing the "Commissioner of Patents, Washington, D. C."